United States Patent [19]

Rodney

[11] 4,307,910
[45] Dec. 29, 1981

[54] RAILWAY WHEELS AND LIGHT WEIGHT AXLES

[75] Inventor: Eschenburg Rodney, San Diego, Calif.

[73] Assignee: Pullman Incorporated, Chicago, Ill.

[21] Appl. No.: 137,176

[22] Filed: Apr. 4, 1980

[51] Int. Cl.³ .................... B60B 17/00; B60B 35/14; B60B 37/06
[52] U.S. Cl. ................................. 295/36 R; 295/8; 295/21; 295/27; 295/39; 295/40; 295/43
[58] Field of Search ............... 295/7, 8, 21, 27, 36 R, 295/39, 40, 43

[56] References Cited

U.S. PATENT DOCUMENTS

| 90321 | 5/1869 | Van Slooten | 295/36 R X |
| 1,047,380 | 12/1912 | Busch | 295/8 X |
| 2,452,659 | 11/1948 | Huldt | 295/36 R |
| 2,536,313 | 1/1951 | Schaub | 295/36 R |

FOREIGN PATENT DOCUMENTS

| 582997 | 12/1946 | United Kingdom | 295/36 R |
| 590317 | 7/1947 | United Kingdom | 295/36 R |

Primary Examiner—Joseph F. Peters, Jr.
Assistant Examiner—Howard Beltran
Attorney, Agent, or Firm—Paul A. Kerstein

[57] ABSTRACT

A lightweight wheel and axle assembly that reduces unsprung weight thereby improving the ride. The assembly also diminishes hunting and reduces tendencies towards unstable dynamic conditions. The wheel and axle assembly is easily adaptable to conventional three-piece trucks as well as to other truck designs.

10 Claims, 5 Drawing Figures

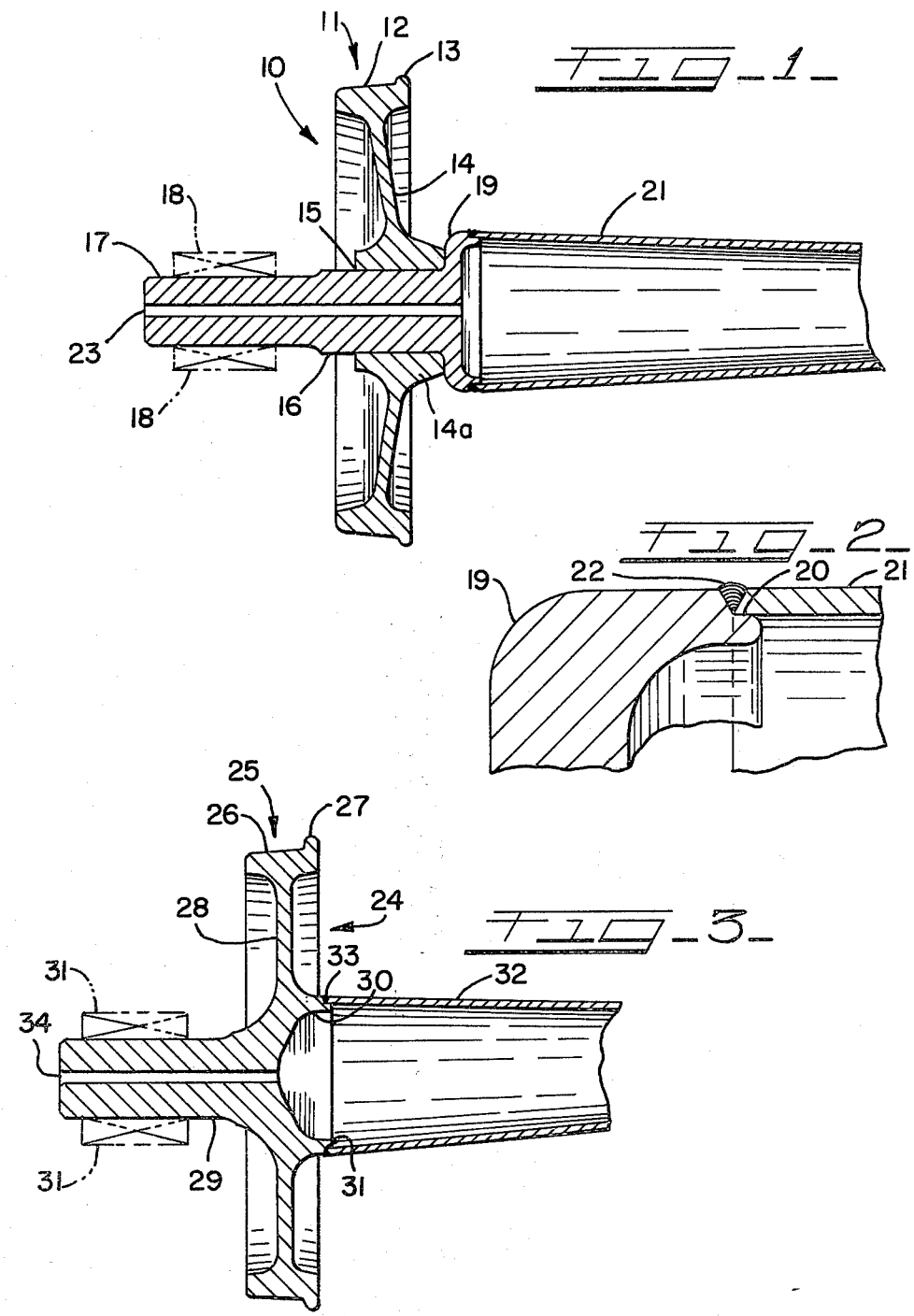

RAILWAY WHEELS AND LIGHT WEIGHT AXLES

BACKGROUND OF THE INVENTION

1. Field of the Invention

This invention relates generally to railway cars and more particularly concerns wheel and axle assemblies for railway cars.

2. Description of the Prior Art

Railroad cars usually comprise two bogies or trucks with each truck having two sets of wheel and axle assemblies. The wheel and axle assemblies usually are solid components which add considerable unsprung weight to the railroad car. Further, the wheels are pressed on the axles to provide an interference fit.

Accordingly, it is the primary aim of this invention to provide lightweight wheel and axle assemblies easily adaptable to conventional truck designs.

A further object is to reduce unsprung weight in railroad cars, to reduce hunting, reduce tendencies towards unstable dynamic conditions and increase payload and performance.

The present invention includes a plurality of embodiments, each of which is an improvement over the Prior Art in that each includes a tubular axle connected to a journal portion of a different type car wheel, all resulting in a strong and lightweight assembly.

SUMMARY OF THE INVENTION

In accordance with the invention, a lightweight wheel and axle assembly includes car wheels having dish-shaped hub portions laterally extending in one direction, and a journal element laterally extending in the opposite direction. The car wheels are then connected to a tubular axle at their dish-shaped hub portions.

In one embodiment of the invention, the car wheel is integral with the journal element and its dish-shaped hub portion. The hub portion includes an undercut circumferentially extending connecting portion at its outer end. The tubular axle is connected to the outer end of the hub portion by a V-weld connection.

Another mode of the invention has the journal element integral with the car wheel. Further, a tubular axle is disposed in telescoping relation with respect to the dish-shaped hub portion. The tubular axle and wheel are joined by removable fasteners.

Still another mode of the invention has the journal element integral with a hub portion and the journal element being supported within a central opening in a car wheel. The hub portion includes an undercut circumferentially extending connecting portion at its outer end which receives a tubular axle. The axle and hub portion are connected by a V-weld connection.

Introducing a tubular axle in the above novel combination reduces the weight of the railway cars considerably, especially in view of the fact that there are four wheel and axle assemblies per railway car.

While the invention will be described in connection with certain preferred embodiments, it will be understood that it is not intended to limit the invention to these embodiments. On the contrary, it is intended to cover all alternatives, modifications and equivalents which are included in the spirit and scope of the invention as defined by the appended claims.

BRIEF DESCRIPTION OF THE DRAWINGS

FIG. 1 is a sectional view of one of the embodiments of the invention.

FIG. 2 is an enlarged view of a portion of the embodiment of FIG. 1.

FIG. 3 is a sectional view of another of the embodiments of the invention.

DESCRIPTION OF THE PREFERRED EMBODIMENT

Figure 4:
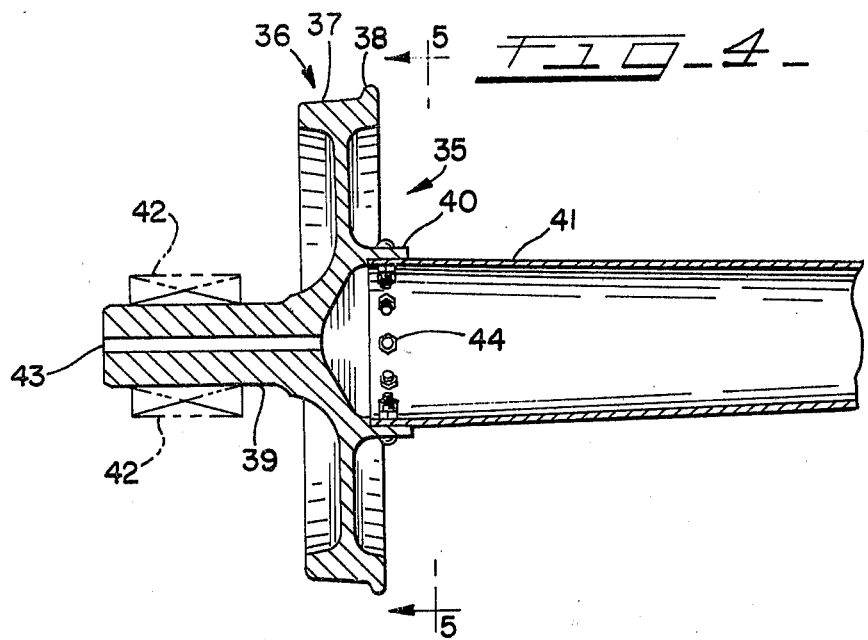
FIG. 4 is a sectional view of another of the embodiments of the invention.

Turning now to the drawings, FIG. 1 shows one end of a wheel and axle assembly. In this embodiment the wheel 10 includes a rim 11 extending circumferentially about the periphery of the wheel 10. The rim 11 includes a tread 12 and an upstanding flange portion 13. The wheel 10 further includes a web 14 integral with it and a hub 14a integral with the web 15.

The wheel 10 has a central opening 15. The opening 15 is adapted to receive and support a journal element 16 therein. The wheel 10 is pressed onto the journal element 16 to produce an interference or friction fit. One end of the journal element 16 includes a journal portion 17 which is suited to mesh with standard tapered roller bearings 18, while the other end of the journal element 16 includes a hub flanges 19 contiguous with the hub 14a. The hub flanges 19 is dish shaped with its opening extending oppositely of the journal portion 17. The circumference of the hub flange 19 is larger than that of the central opening 15 and includes an undercut connecting marginal edge portion 20 at its outer end as best seen in FIG. 2.

A tubular axle 21 having a slightly larger diameter at its end than at its middle is tapered therebetween. The tubular axle 21 achieves the same properties as solid axles but weighs considerably less. In its connection to the wheels 10, the axle 21 overlies and is adjacent to the undercut connecting portion 20 of the hub flange 19. The axle 21 is fixedly connected to the wheel 10 by means of a V-weld connection 22. The V-weld is used for proper weld penetration in this critical area. A bore 23 runs longitudinally about the longitudial axis of the journal element 16 to provide a means for gas produced by the welding operation to escape.

Another embodiment of the invention is depicted in FIG. 3. A wheel 24 includes a rim 25 that extends circumferentially about the periphery of the wheel 24. The rim 25 includes a tread 26 and upstanding flange portion 27. The wheel 24 also includes a web 28 integral with it and lying within the same plane.

The wheel 24 further includes an integral journal element portion 29 on one side thereof and extending outwardly of the wheel and a dish-shaped hub portion 30 with its opening facing in the opposite direction of the extension of the journal element portion 29. The journal element portion 29 is adapted to receive standard tapered roller bearings 31. The hub portions 30 includes an undercut connecting portion 31 circumferentially situated.

A tubular axle 32 much like the one described above in reference to 21 is connected at its outer ends to a pair of wheels. The tubular axle 32 overlies and is adjacent to the undercut portion 31 of the hub 30. The axle 32 is connected to the wheel 24 by means of V-weld connection 33 and is theretofore described. Also, a bore 34 that runs longitudinal through the journal element portion 29 to the hub 30 is provided for escape of gas produced during the welding operation.

Figure 5:
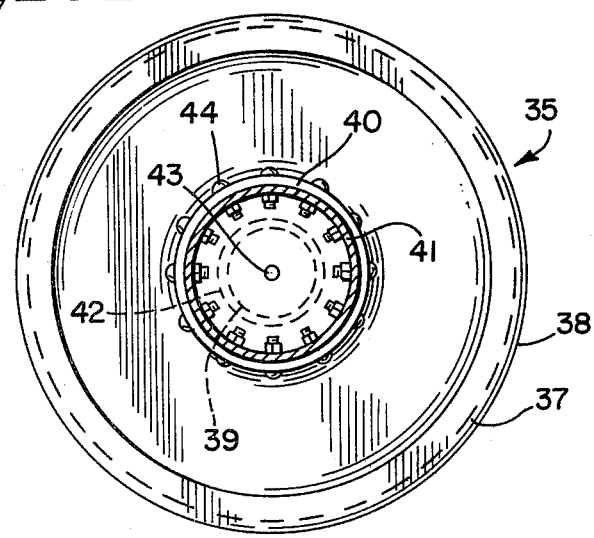
FIG. 5 is a view taken along 5—5 of FIG. 4.

A further embodiment is shown in FIGS. 4 and 5. Here, a wheel 35 is constructed in the same manner as the wheel 24 in FIG. 3. The wheel 35 includes a circumferentially extending rim 36 and a tread 37 and an upstanding flange 38. The wheel further includes an integral journal element portion 39 on one side of the wheel 35 and extends outwardly. An integral dish shaped hub 40 is situated on the other side of the wheel 35 and has its mouth portion opening oppositely of said journal element portion 39. The journal element portion 39 which is suited to receive standard tapered rolling bearings 42.

A tubular axle 41 much like the one described above is connected at its upper ends to a pair of wheels. Tubular axle 41 and the hub 40 are disposed in telescoping relation and are fixedly connected by removable fasteners or lock bolts 44.

Thus, in the above-described lightweight wheel and axle assemblies the invention accomplishes weight reduction for railway cars. The reduction is sufficient when one considers there are four wheel and axle sets per railway car. The weight reduction lowers the energy need for rotation, increases performance with an accompanying increase in usable payload.

The weight reduction also reduces the unsprung weight that needs to be damped, thereby reducing tendencies towards unstable dynamic conditions and improving the ride. The lightweight wheel and axle assemblies are further designed to be readily adaptable to conventional truck designs.

It is therefore apparent there has been provided in accordance with the invention a lightweight wheel and axle assembly that fully satisfies the objects aimed and advantages set forth above. While the invention has been described in conjunction with specific embodiments thereof, it is evident that many alternatives, modifications, and variations will be apparent to those skilled in the art in light of the foregoing description. Accordingly, it is intended to enhance all such alternatives, modifications, and variations as set forth with the spirit and broad scope of the appended claims.

What is claimed is:

1. A railway car wheel and axle assembly comprising;
a car wheel,
a journal element integrally mounted on said car wheel and projecting laterally outwardly from one side thereof,
said journal element having a hub having a wheel load carrying portion and projecting inwardly from said wheel in a direction opposite to the projection of said journal element,
said hub having a deep hollow dish-shaped portion,
a tubular axle overlapped with a marginal edge portion of said dish-shaped position and connected thereto, and
said dish-shaped portion being disposed inwardly of said wheel in a portion for resisting forces acting on said wheel, whereby the wall thickness of the associated axle is substantially thinner than the wall thickness of the load-carrying portion of the hub.

2. The wheel and axle assembly in accordance with claim 1,
connecting means securing said tubular axle to said dish-shaped portion including a V-shaped weld connection.

3. The invention in accordance with claim 1,
said axle being connected to said hub by removable fasteners.

4. A railway car wheel and axle assembly in accordance with claim 1,
said disc shaped portion including an undercut circumferentially extending connecting portion of greater diameter than said journal element portion,
said tubular axle including means connecting the same to said connecting portion.

5. A railway car wheel and axle assembly comprising:
a car wheel having a web and tread portion,
a tubular axle connected with said wheel,
a journal element of an essentially constant cross-section mounted on said car wheel and projecting laterally outwardly from said web portion.
said journal element being integral with said car wheel and including end means extending diagonally outwardly and circumferentially of said journal element in essential alignment with said web portion thereby rigidifying wheel-to-journal element junction and permitting a significant reduction of a wall thickness of said journal element,
said end means and said web portion being monolythic, and said end means having connecting means extending inwardly of said web portion and securing an attachment of said wheel to said axle.

6. A railway car wheel and axle assembly in accordance with claim 5, and
said end means having a dish-shaped configuration with its outer circumferential edge facing said axle.

7. The invention in accordance with claim 5, and
said connecting means having circumferentially extending undercut portion adapted to be rigidly attached to said axle.

8. A railway car wheel and axle assembly comprising:
a car wheel having a web and tread portions,
a tubular axle associated with said wheel,
said web portion having a hub extending transversely thereof,
said hub having a central opening,
a cylinder journal element having a load carrying portion and projecting laterally outwardly from said web portion through said opening,
said journal element having a dish-shaped end portion extending circumferentially outwardly and transversely inwardly thereof and including an outer groove facing said axle,
an end portion being disposed inwardly of said web portion and in abutment with an inner portion of said hub,
said outer groove having connecting means for rigid attachment of said axle.

9. The invention in accordance with claim 8, and
said outer groove having a circumferentially extending undercut outer end.

10. The invention in accordance with claim 8,
the central opening of said hub having a larger diameter than said journal element.

* * * * *